United States Patent [19]

Sutton

[11] Patent Number: 4,530,020
[45] Date of Patent: Jul. 16, 1985

[54] SELF-TIMED RUNOUT CORRECTION PATTERN

[75] Inventor: David A. Sutton, Santa Ynez, Calif.
[73] Assignee: DMA Systems, Goleta, Calif.
[21] Appl. No.: 617,887
[22] Filed: Jun. 6, 1984
[51] Int. Cl.³ .................. G11B 5/58; G11B 21/10; G11B 23/36
[52] U.S. Cl. ...................... 360/77; 360/135
[58] Field of Search .................. 360/77, 78, 135

[56] References Cited

U.S. PATENT DOCUMENTS

| | | | |
|---|---|---|---|
| 4,135,217 | 1/1979 | Jacques et al. | 360/77 |
| 4,149,199 | 4/1979 | Chick et al. | 360/77 |
| 4,157,577 | 6/1979 | Porter, Jr. et al. | 360/77 |
| 4,188,646 | 2/1980 | Sordello et al. | 360/77 |
| 4,286,296 | 8/1981 | Cunningham | 360/77 |
| 4,371,960 | 2/1983 | Kroiss | 369/43 |

Primary Examiner—George G. Stellar
Attorney, Agent, or Firm—Spensley Horn Jubas & Lubitz

[57] ABSTRACT

A runout correction pattern is recorded on the peripheral track of the disk during the initial recording of the data stored thereon. The runout correction pattern comprises an integer number of sequentially recorded groups, each comprised of an increment of full track erasure, a like increment of high transition density automatic gain control information, a first burst of servo control information, and a second burst of servo control information. Previously necessary clock tracks are not incorporated. The bursts of servo control information are recorded "off-track" by one-half of the center line to center line spacing between adjacent tracks so that all first bursts are to one side of the center line of the track and all second bursts are to the opposite side of the center line of the track. Decoding of the runout correction patterns by a positionally fixed playback transducer establishes runout correction information which may be provided to control, as a function of rotational angle of the disk, the servo mechanism adjusting the playback transducer position during playback of the data stored on the disk.

6 Claims, 2 Drawing Figures

SELF-TIMED RUNOUT CORRECTION PATTERN

BACKGROUND OF THE INVENTION

1. Field of the Invention

This invention relates to a self-timed method for compensating for track eccentricity or runout in a rotating recording disk. More particularly, it relates to a technique for entering compensation data onto the disk by the drive recording information to be stored onto the disk, which compensation data may be subsequently used, without the need for reading a separate clock track, to correct track runout during playback by the same or another drive unit.

2. Discussion of the Prior Art

In many data storage systems, particularly in the field of data processing, recording and information storage utilize a disk-type format. In many cases it is necessary to position a playback transducer or "read head" at a desired data track on the disk with great precision. This is because the information tracks on such disks are often in the form of concentric circles that may be only of the order of 1 milliinches wide and spaced with even lesser distance between tracks on the disk. If the transducer is improperly positioned, information recorded on an adjacent track may be sensed and thus lead to erroneous data recovery. The minimum track spacings are thus directly dependent upon the accuracy with which the transducer can be positioned relative to the disk.

When information is being retrieved from the disk there may be a lack of concentricity between the center of rotation of the disk and the circular data track previously recorded on that disk. This problem is of special concern in disk drives where removable media and interchange of data between drives is included as a design parameter. Differences in the mechanical construction between disk drive units may create such an eccentricity during playback on a disk drive other than the one used to create the disk. Even when the disk is to be be read by the same disk drive on which it was created, if the disk has been removed for one reason or another and then reinserted, it is sometimes quite difficult to return the disk to its original center of rotation. Consequently, the centers of the circles describing the information tracks no longer correspond to the center of rotation of the disk. Without compensation, the read head transducer may read information from adjacent tracks in an overlapping manner depending on the degree of eccentricity or runout, in which case the output from the transducer would be erroneous.

Several types of systems have been proposed to compensate for tracking error during playback. Examples of some recent developments are shown in U.S. Pat. Nos.: 4,135,217; 4,149,199; 4,157,577; 4,188,646; 4,286,296; and 4,371,960. One type of system utilizes a plurality of servo control tracks per surface to establish a continuous runout error correction signal around the circumference of the disk. Another system reads runout error in at least three segmental positions of rotation of the disk and computes a circle of errors passing through the runout error measured at the three reference positions. That circle is then stored and used to control the read head positioning during data recovery.

Other such systems employ a pair of transducers, one of which is dedicated to read servo reference information from one or more tracks which is used to control servo mechanism correcting the positioning of the playback transducer. Still other systems utilize combinations of the above, including having servo control information appear in a plurality of sectors around the disk on each track such that correction information is generated periodically during rotation of the disk. Each data track thus contains its own transducer position control information.

Each of these systems requires extensive data processing implementation to decode the servo reference information available and to then place that information in a form useful for controlling the position of the playback transducer. Moreover, generally these prior systems require the presence of a clock track to establish proper timing for the decoding of the servo reference information.

SUMMARY OF THE INVENTION

It is a primary object of the present invention to provide a pattern written on a track of a rotatable information storage disk by a servo pattern writing unit, typically separate from a disk drive used to record information on the disk, which pattern may be subsequently read to establish eccentricity in the recording tracks of the disk during playback period.

Another object of the invention is to provide a method for determining the amount of eccentricity of a recording track on a rotatable recording disk during playback on a disk drive other than the one on which data was recorded.

A further object of the invention is to provide a pattern useful for determining and compensating for tracking errors due to eccentricity in the recording track on a disk during playback.

Another object of the invention is to provide a servo control pattern written on a track of a rotatable information storage disk and a method for decoding said pattern which is self-timing and does not require a separate clock track on said disk.

The present invention comprises a pattern written on a track of rotatable recording disk by a disk drive as part of the process of transcribing data and other information onto the recording disk for storage and subsequent replay. Additionally, the invention comprises the several steps and the relationships of one or more of such steps with respect to each of the others and to an apparatus embodying the features of construction, combination of elements, and arrangement of parts which are adapted to effect such steps, all as exemplified in the following detailed description, and of a scope of the invention as will be indicated in the claims.

Variations in construction of disk drives and in the manufacture of disks to be used in disk drives often produce effects, during playback, which have the appearance of an eccentricity in the track along which information is recorded. This is true even though, during the recording of data on a given disk by a given disk drive, the track is concentric with the center of rotation of the disk. If the disk is subsequently removed from the disk drive and replaced in the same or another disk drive, the center of rotation may differ due to the manufacturing tolerances. Proper recovery of the recorded information therefore requires that the transducer reading the track appropriately follow the eccentricity thus induced. The transducer generally has a servo mechanism to control its position relative to the disk.

Accordingly, during the process of recording the information on a disk, a run out correction pattern is recorded on a track of the disk so as to provide servo control information which may be processed during playback to control the positioning of the playback transducer as a function of rotational position of the disk.

The pattern written on a track of the disk in accordance with the present invention comprises an increment of full track erasure immediately followed by an increment of high transition density automatic gain control (AGC) information followed by an "A" burst of servo control information followed by a "B" burst of servo control information. This sequence is repeated an integer number of times around the circle describing the center line of the track on which the pattern is written. The time increments for the several increments comprising the basic pattern are controllably adjustable, by an external digital processor, to produce the desired integer number of pattern sequence repetitions.

In a typical application of the present invention, the runout correction pattern is written on the outermost peripheral track, often referred to as the reference track, of the disk. Typically, sixteen repetitions of the pattern are written, although other integer repetitions are possible. The number of repetitions of the pattern is limited to a maximum number wherein the time durations of the several increments remain adequate to allow accurate decoding and retention of the servo control information, and in the minimum by a number providing for a sufficient number of angular compensation points to establish adequate runout correction.

During the recording of the runout correction pattern, each of the "A" bursts of servo control information is written on the disk so as to be offset from the center line of the runout correction pattern track by one-half of the center line to center line spacing between adjacent tracks. Each of the "B" bursts of servo control information are similarly written to be off track by one-half of the center line to center line spacing between adjacent tracks but to the side of the center line of the runout correction pattern track opposite to that of the corresponding "A" servo control burst.

During playback of the information contained on the disk, the runout correction pattern track is first read by the transducer of the disk drive so that each pair of bursts of servo control information, comprising an "A" burst and a corresponding "B" burst, is decoded and processed to established a runout correction factor appropriate to that angular position on the disk. These runout correction factors are retained in the external digital processor correlated to their respective angular positions on the disk. When the disk drive is called upon to read a track containing data information, the position of the read head transducer is compensated to maintain an "on track" location in accordance with the angular position of the disk using the retained runout compensation factors.

Each data track may include a single repetition of the above-described pattern to serve as an initialization of the playback transducer position from which position the compensations may be applied. Additionally, a mechanical index associated with the mechanism causing rotation of the disk is typically available to serve as a basis for initialization of the angular positions of the runout correction factors.

BRIEF DESCRIPTION OF THE DRAWING

For a more complete understanding of the nature and objects of the invention herein described, reference should be had to the following detailed description taken in connection with the accompanying drawing.

DESCRIPTION OF THE INVENTION

Figure 1:
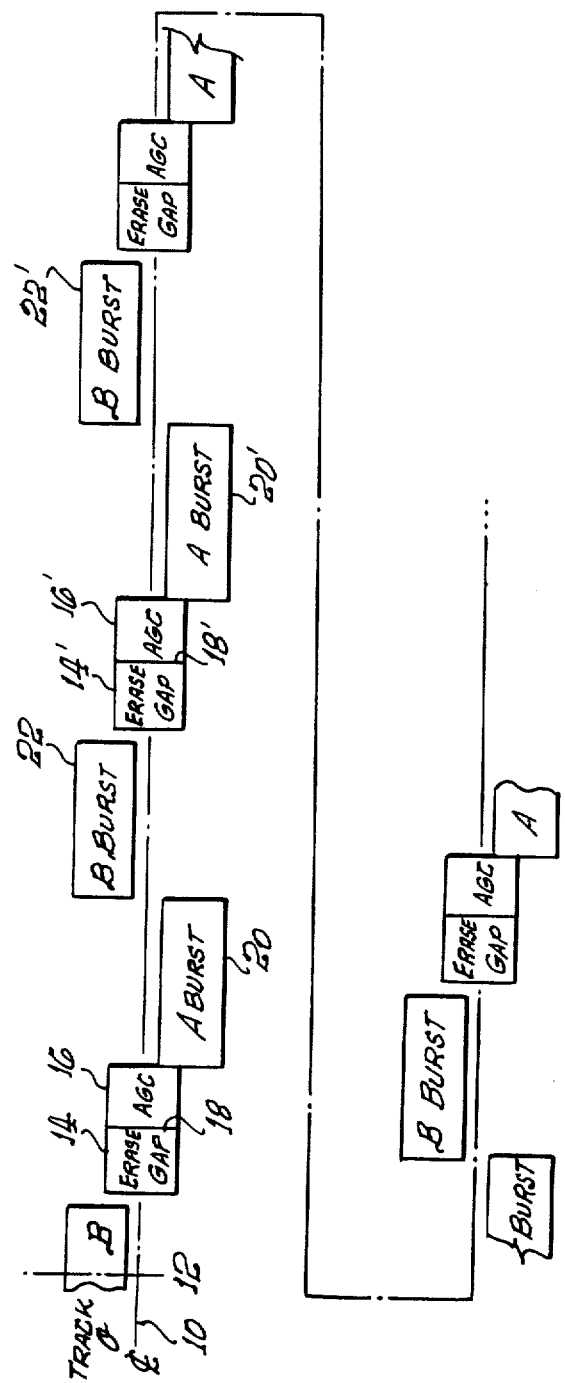
FIG. 1 presents a block diagrammatic representation of a linearized arc segment of a circular runout correction track on a disk, illustrating the runout correction pattern of the present invention.

Referring first to FIG. 1, a runout correction pattern in accordance with the present invention is written on a conventional data storage disk by a write transducer of a conventional disk drive unit wherein the transducer may be controllably positioned to record information on any one of a number of "tracks" on the disk. The disk is initially provided in a state where it is totally erased. Alternatively, an erasing transducer may be initially passed across the surface of the disk to erase any residual information thereon.

The write transducer of the disk drive is positioned near the periphery of the disk so that, as the disk rotates past the write transducer, a track may be written on the disk having a center line indicated at 10. The representation of FIG. 1 is a linearization of the center line 10 in that the center line will, in reality, describe a circle about the center of rotation of the disk. For purposes of illustration, FIG. 1 is drawn to reflect a rotation of the disk from right to left past the transducer. To generate the runout correction pattern in accordance with the present invention, a mechanical index associated with the rotation of the disk is first sensed to establish an initial time 12. Knowing the rotational velocity of the disk, which is a function of the disk drive, a digital processor may be used to establish time increments for the information increments to be written on the disk so that an integer number of increment groupings, or patterns, as described below, may be written along the circle described by the center line 10.

On sensing the occurrence of the mechanical index at time 12, the digital processor controls the write transducer to totally erase the track 10 for an increment of time forming an erase gap 14. Immediately thereafter the write transducer writes a burst of automatic gain control (AGC) information 16 along track 10. The AGC information consists of a sequence of high-density transitions. The write transducer is then inhibited for a time increment equivalent to that necessary to subsequently write both an "A" burst and a "B" burst of servo control information in series sequence. The write head is then controlled to produce a second increment of track erasure 14' and a second burst of AGC information 16', having identical characteristics and time durations as the first erase gap 14 and AGC burst 16 previously written. A second time increment, equivalent in duration to the previously described increment wherein the write head is inhibited for later writing of an "A" burst and a "B" burst of servo control information, is then provided. This process of writing an erase gap followed by an AGC burst followed a write inhibited time increment is repeated around one revolution of the disk. Appropriate establishment by the digital processor of the several time increments of each erase gap, AGC burst and write inhibited time delay sequence enables an integer number of such patterns to be written around the track 10 during a single revolution of the disk.

Following completion of the writing of the erase gap 14 and AGC burst 16 increments around the full circle of the track 10, the write transducer of the disk drive is repositioned either inwardly (toward the center of the disk) or outwardly (toward the periphery of the disk) by a distance substantially equal to one half of the center line to center line distance between adjacent data tracks written on the disk. The digital processor then enables the read or playback function of the transducer which enables detection of the transition 18 between the erase gap 14 and the AGC burst 16 written along the track 10. The detection of the transition 18 causes the digital processor to enable the write function of the transducer and, after a delay equivalent in duration to the extent of the AGC burst 16, the transducer then writes an "A" burst of servo control information 20 for one-half of the time increment between the end of the AGC burst 16 and the end of the time period established for the combined "A" and "B" bursts. The transducer is then again placed in the read mode in preparation for detection of the transition 18' between the next subsequent erase gap 14' and AGC burst 16'. When the transition 18' has been detected, the write function is again enabled to write a second "A" burst of servo control information 20' immediately following the end of the second AGC burst 16'. This process is repeated until an "A" burst of servo control information has been written immediately following each of the AGC bursts occuring around the revolution of the disk.

The transducer of the disk drive is then repositioned to the opposite side of the center line of track 10 by a distance equivalent to one half of the center line to center line distance between adjacent tracks. The read function of the transducer is again enabled to detect the transition 18. Upon detection of the transition 18, the digital processor delays for a period of time equivalent of the passage of the AGC burst 16 and the "A" burst of servo control information 20, at which time a "B" burst of servo control information 22 is written on the disk so as to terminate at the end of the time period established for the "B" burst. Again using the read function of the transducer to detect the transition 18', an appropriate time delay is established before a second "B" burst of servo control information 22' is written on the disk. A "B" burst of servo control information is written in this manner for each of the erase gap to AGC burst transitions occurring during a single revolution of the disk.

Upon completion of the writing of the integer number of runout correction pattern segments, as described above, the transducer of the disk drive may be then repositioned to a center line of a first data track to be written on the disk. Each of the plurality of such data tracks to be placed on the disk may then be appropriately written with track and sector identification, servo control initilization information, and data.

As an alternate preferred method of writing a runout correction pattern in accordance with the present invention, a full revolution of high density transitions are written along the track 10. On the second full revolution of the disk, starting with the sensing of the mechanical index establishing the initial time 12, the digital processor may establish time increments during which bursts of d.c. erase signals are written at the "A" burst, "B" burst, and erase gap locations. This results in a burst of high density transitions at the AGC information locations. The "A" bursts and "B" bursts of servo control information are then written on subsequent revolutions as described for the first perferred embodiment.

Figure 2:
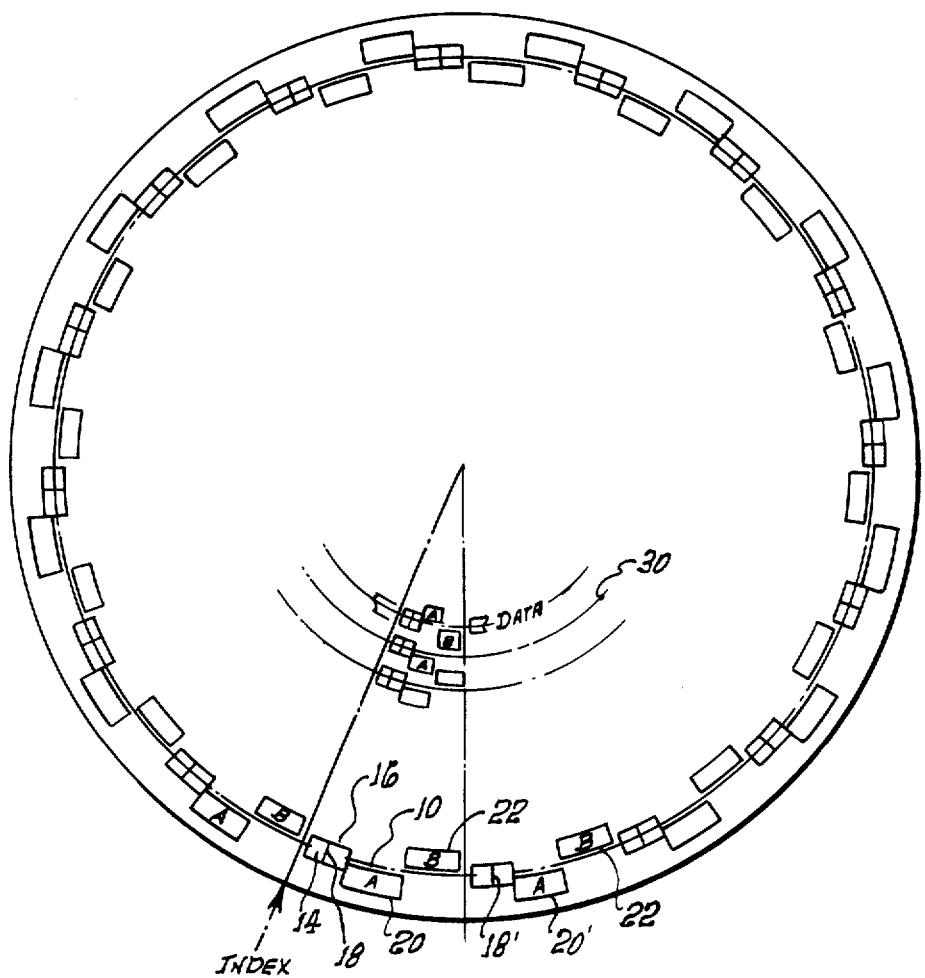
FIG. 2 shows a planar representation of a surface of a disk having runout correction pattern in accordance with the present invention recorded thereon.

Referring next to FIG. 2, subsequently, the runout correction pattern written on track 10, the runout reference track of the disk, may be read by the transducer and the transducer output waveforms may be processed to establish transducer positional correction information as a function of rotational position around the disk. To accomplish this, the transducer, operating in its read mode, is positioned along the presumed center line of track 10. By sensing the transition 18 between the first erase gap 14 and first AGC burst 16, appropriate time increments are established wherein first the "A" burst of servo control information 20 and then the "B" burst of servo control information 22 are to be found. The amplitude of the signals recorded on the track 10 may be recovered by any of several methods, such as peak detection, single or dual slope integretion, flash conversion, successive approximation, etc., so long as such method is amenable to digitigation. By processing the "A" burst of servo control information 20 and the "B" burst of servo control information 22 utilizing known comparator processing techniques, a digital output may be generated which is proportional to the amount of offset from the center line of track 10 relative to the fixed position of the transducer head. This information may be retained in the digital processor, related to the angle of rotation of the disk by the time of the transition 18, for subsequent use in repositioning the transducer head during reading of the data tracks. Similar processing of the next pair of "A" and "B" bursts of servo control information 20' and 22', during a time increment established by the detection of the transition 18', provides a second runout correction digital signal for retention by the digital processor. Maintaining the read transducer in a fixed position relative to the disk as the disk rotates past the transducer, each pair of "A" and "B" bursts of servo control information occuring during a single revolution of the disk will provide a like number of runout correction signals, each related to its immediately preceeding erase gap-to-AGC burst transition. Since the erase gap-to-AGC burst transitions were written at established times relative to the mechanical index associated with the rotation of the disk, each of the runout correction signals is relatable to an angular position around the disk.

During the recovery of data recorded on the disk in the playback or read mode operation, the transducer is first positioned to be centered along a desired data track 30 by the initialization servo control information 31 recorded on the disk and then, as the disk rotates through a revolution around the data track, the runout corrections retained by the digital processor are applied to the transducer servo mechanism to adjust the position of the transducer as a function of the angle of rotation from the mechanical index, thereby enabling the transducer to more closely approximate the center line of the data track being read regardless of mechanical imperfection and tolerance created errors.

It will thus be seen that the objects set forth above, and those made apparent from the preceeding description, are efficiently attained. Also, it should be understood that certain changes may be made in carrying out the above method without departing from the scope of the invention. Therefore, it is intended that all matter contained in the above description or shown in the accompanying Figure shall be interpreted as illustrative and not in a limiting sense. It is also to be understood that the following claims are intended to cover all of the generic and specific features of the invention herein described.

I claim:

1. A method for a self-timed compensation of a positioning of a transducer with respect to a data track on a rotating planar recording medium, wherein said rotating planar recording medium has a physical index associated with the rotation thereof, wherein said rotating planar recording medium has transducer position servo correction information recorded on, and distributed around, a peripheral track thereof, said transducer position servo correction information being referenced to said physical index, and wherein said rotating planar recording medium has track center line information recorded each data track thereof referenced to the time of passage of said physical index; comprising the steps of:

(a) positioning said transducer to be cooperatively aligned with said peripheral track of said rotating recording medium at said physical index and retaining said transducer in said position;

(b) reproducing and processing said transducer position servo correction information to establish and retain transducer position correction servo control signals as a function of the rotational position of said rotating planar recording medium with reference to said physical index; and (c) subsequently applying said transducer position correction servo control signals as a function of the rotational position of said rotating planar recording medium so as to adjust the position of said transducer with respect to a center line of a data track recorded on said rotating planar recording medium, said transducer being initially aligned with said center line at the time of passage of said physical index in response to said track center line correction information.

2. A method for a self-timed compensation of the positioning of a transducer with respect to a data track on a rotating planar recording medium, wherein the rotation of said recording medium has a physical index associated therewith and wherein said rotating planar recording medium has recorded on a peripheral track thereof an integer number of identical repetitive signal groups, each containing transducer position servo control information, equiangularly distributed at known rotational increments with respect to said physical index, and wherein each data track has a burst of track center line identification information recorded thereon substantially within a rotational increment of said rotating planar recording medium immediately following the passage of said physical index; comprising the steps of:

a. positioning said transducer to be cooperatively aligned with a center line of said peripheral track of said rotating planar recording medium at said physical index and retaining said transducer in said position;

b. reproducing, using said transducer in a reproducing mode, said integer number of signal groups through a single revolution of said rotating recording medium;

c. simultaneously retaining, for each of said signal groups, a time of its occurrence with respect to the time of passage of said physical index, and a transducer position servo adjustment signal derived from the transducer position servo control information contained in each signal group, each of said adjustment signals being related to said referenced time of occurrence;

d. subsequently repositioning said transducer to a center line of a desired data track of said rotating planar recording medium for the reproduction of data thereon, said position being achieved in response to said track center line identification information at the passage of said physical index; and e. adjusting the position of said transducer with respect to said data track in response to said retained adjustment signals as a function of the rotational position of said recording medium with respect to said physical index.

3. A method for a self-timed compensation of the positioning of a transducer with respect to a rotating planar recording medium, wherein said rotating planar recording medium has a physical index associated therewith, comprising the steps of:

a. sensing the passage of said physical index;

b. establishing a time reference and a rotational reference based upon said sensing of said physical index;

c. recording, using said transducer in a recording mode, an integer number of identical repetitive signal groups containing servo control information around a single peripheral track of said rotating planar recording medium, said integer number of signal groups being appropriately timed with respect to said physical index so as to be equiangularly distributed around said track;

d. repositioning said transducer radially inwardly by an increment of one full track width and then recording, using said transducer in a recording mode, a burst of track center line identification information within a rotational increment at a timed position with respect to said physical index to establish a data track, and repeating said repositioning and recording until all possible data tracks have been so indentified;

e. subsequently positioning and retaining said transducer so as to be centered with respect to a center line of said peripheral track on said rotating planar recording medium at the rotational position of said physical index;

f. sensing the passage of said physical index;

g. establishing a time reference and a rotational reference based upon said sensing of said physical index;

h. reproducing, using said transducer in a reproducing mode, said integer number of signal groups on said peripheral track of said rotating recording medium, identifying and retaining, for each group, the time of its occurrence with respect to the passage of said physical index and a servo correction signal derived from said group;

i. subsequently repositioning said transducer to the center line of a desired data track of said rotating planar recording medium in response to said track center line identification information recorded thereon in step (d); and j. adjusting the positioning of said transducer, as said data track rotationally passes, in response to said retained servo correction signals, referenced to the sensing of the passage of said physical index.

4. A method of compensating for eccentricity or runout in a circular recording track on a recording disk rotating about an axis during playback, comprising the steps of:

a. recording, on a runout correction track of the recording disk, during the process of recording data on said disk, an integer number of equiangularly spaced groups of information segments fully enclosing a circle on said disk forming said runout correction track, wherein each of said groups comprises a sequence formed of an erase gap of known duration, an automatic gain control increment of known duration, an "A" burst of servo control information of known duration, and a "B" burst of servo control information of known duration, said "A" burst of servo control information being written to one side of the center line of said runout correction track by one-half of the center line to center line spacing between adjacent tracks and said "B" burst of servo control information being written to the opposite side of the center line of said runout correction track by one-half of the center line to center line spacing between adjacent tracks;

b. moving a playback transducer to a position substantially aligned with the center line of said runout correction track and maintaining said transducer in said position;

c. processing output waveforms produced by said playback transducer, utilizing the known time occurrences of said "A" and "B" bursts of servo control information, related to a mechanical index travelling with rotation of the disk, to establish digital runout correction signals as a function of rotational angle around said disk; and d. controlling the movement of the playback transducer, during playback of a given data track on said disk, in phase with and under the control of said runout correction signals to correspond with the angle of rotation of the disk about its axis of rotation.

5. A method for producing a runout correction pattern on a circular recording track on a fully erased recording disk rotating about an axis in a disk drive unit comprising the steps of:

(a) positioning a transducer of said disk drive, by controlled motion of a servo mechanism associated with said transducer, to a position defining said track centered at least one and one-half widths of said transducer from the periphery of said disk;

(b) sensing a mechanical index associated with the rotation of said disk in said disk drive;

(c) recording on said track a period of full track erasure followed by a like period of high transition density automatic gain control information;

(d) inhibiting the recording for a time increment equivalent to twice the predetermined length of a burst of servo control information;

(e) repeating steps (c) and (d) continuously during one revolution of said disk to provide an integer number of such step sequences around said circular track;

(f) repositioning said transducer of said disk drive by said servo mechanism to a first off-track position centered substantially one-half of the center line to center line spacing between adjacent tracks to one side of said track from the center of said track;

(g) sensing, by a playback function of said transducer, the occurrence of the next sequential transistion between the fully erased period and the automatic gain control information recorded in step (c);

(h) recording on said first off-track position a first burst of servo control information commencing at a time after the sensing of the transition according to step (g) equal to the time extent of said automatic gain control information, and extending for the first one-half of the time increment established in step (d);

(i) repeating steps (g) and (h) sequentially during one revolution of said disk so that a like integer number of first bursts of servo control information are recorded on said first off-track position, one such first burst being associated with each sequence of track erasure and automatic gain control information;

(j) repositioning said transducer of said disk drive by said servo mechanism to a second off-track position centered substantially one-half of the center line to center line spacing between adjacent tracks to the side of said track opposite to that established by step (f);

(k) repeating step (g);

(l) recording on said second off-track position a second burst of servo control information commencing at a time after the sensing of the transition according to step (k) equal to the total time extent of said automatic gain control information plus said first burst of servo control information according to step (h), and extending for the second one-half of the time increment established in step (d); and (m) repeating steps (k) and (l) sequentially during one revolution of said disk so that a like integer number of second bursts of servo control information are recorded on said second off-track position, one such second burst being associated with each sequence of track erasure and automatic gain control information.

6. A runout correction track recorded by a position controllable transducer on a fully erased recording disk rotating about an axis in a disk drive unit, comprising:

an integer number of equiangularly spaced patterns, each comprised in sequence of:
an increment of full track erasure;
a like increment of high transition density automatic gain control information;
a first burst of servo control information; and
a second burst of servo control information;
wherein said increments of full track erasure and automatic gain control information are recorded on an identifiable circular track of said disk substantially adjacent the periphery of said disk, said first bursts of servo control information are recorded with said transducer repositioned by substantially one half of the center line to center line spacing between adjacent tracks and to one side thereof, and said second bursts of servo control information are recorded with said transducer repositioned by substantially one-half of the center line to center line spacing between adjacent tracks and to the side of said track opposite that whereat said first bursts of servo control information are recorded; said integer number of equiangularly spaced patterns being relatable in rotational position around said circular track to a physical index of rotation of said recording disk.

* * * * *